J. F. PLACE.
APPARATUS FOR THE SEPARATION OF THE CONSTITUENTS OF AIR.
APPLICATION FILED JUNE 9, 1915.
1,205,478.
Patented Nov. 21, 1916.
2 SHEETS—SHEET 1.
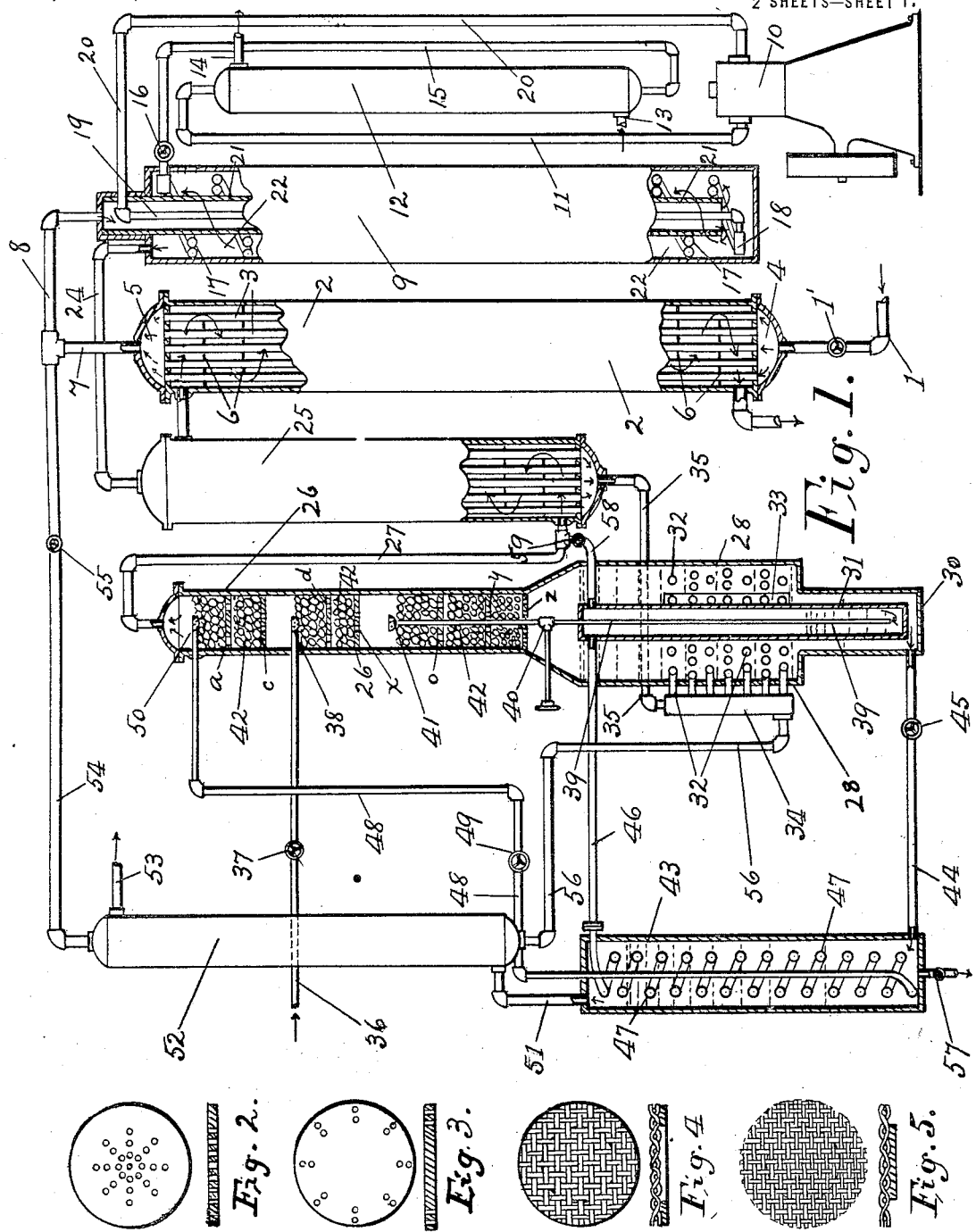

J. F. PLACE.
APPARATUS FOR THE SEPARATION OF THE CONSTITUENTS OF AIR.
APPLICATION FILED JUNE 9, 1915.
1,205,478.
Patented Nov. 21, 1916.
2 SHEETS—SHEET 2.
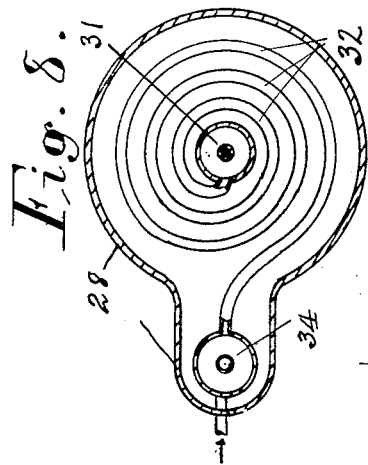
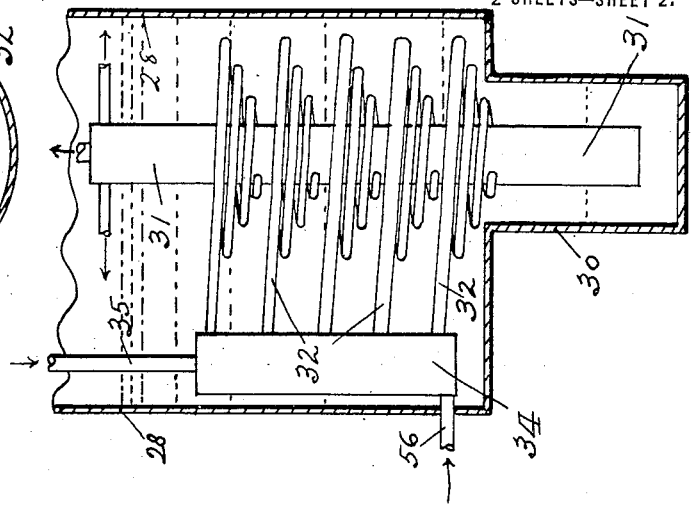
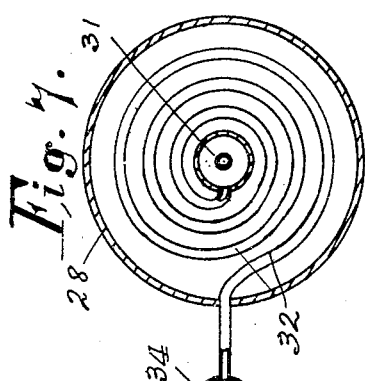
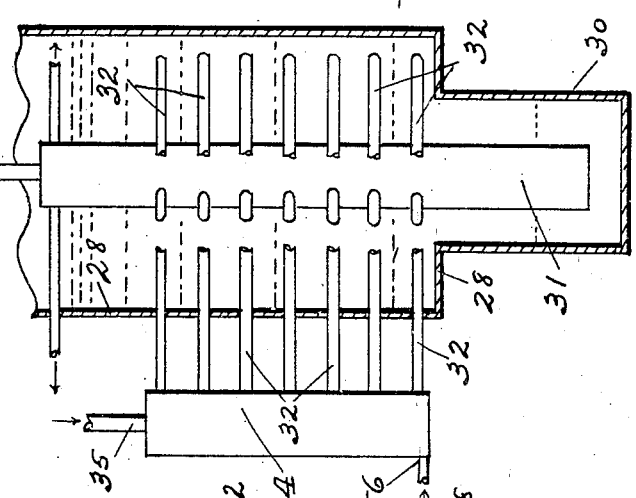
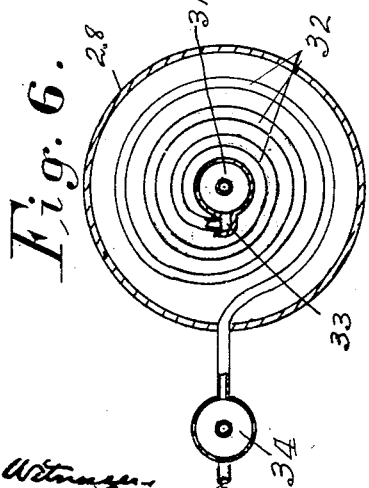
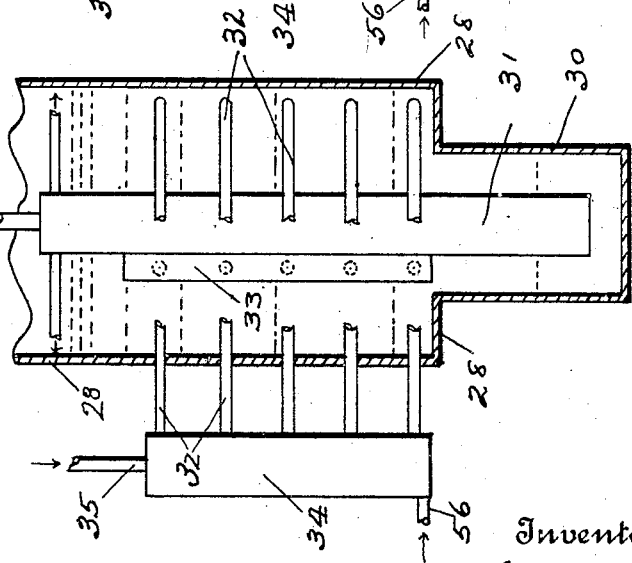
Inventor

UNITED STATES PATENT OFFICE.

JAMES F. PLACE, OF GLEN RIDGE, NEW JERSEY, ASSIGNOR TO AMERICAN AIR LIQUEFYING COMPANY, OF NEW YORK, N. Y., A CORPORATION OF NEW YORK.

APPARATUS FOR THE SEPARATION OF THE CONSTITUENTS OF AIR.

1,205,478.      Specification of Letters Patent.      Patented Nov. 21, 1916.

Application filed June 9, 1915. Serial No. 33,129.

*To all whom it may concern:*

Be it known that I, JAMES F. PLACE, a citizen of the United States, and resident of Glen Ridge, in the county of Essex and State of New Jersey, have invented certain new and useful Improvements in Apparatus for the Separation of the Constituents of Air, of which the following is a specification.

This invention relates to the rectification of air, or the separation therefrom of the two constituent gases thereof, oxygen and nitrogen, and to apparatus therefor.

It embraces also apparatus for the liquefaction of air preparatory to or during the operation of separation of the two gases, into either oxygen liquid and nitrogen gas, or gaseous oxygen and gaseous nitrogen.

The object of this improved apparatus, is to secure a simple operation and cheapen the cost of separation of the constituent gases aforesaid.

In order that those skilled in the art may understand and make use of my invention, I will describe the same, as shown by the accompanying drawings, in which—

Figure 1 is a diagrammatic view of the apparatus as a whole, which I use for liquefaction of air and its rectification, or separation into gases rich in oxygen and other gases rich in nitrogen—the former obtained either as a liquid or gas, and the latter obtained as a gas; the view being partly in elevation and partly in vertical section; Fig. 2 is a view showing a plan and a transverse section of a detail of the construction of the rectifying column; Figs. 3, 4 and 5 are similar views showing modified constructions of such detail; Fig. 6 shows transverse and vertical and longitudinal sectional views of the liquefied gas evaporating low pressure reservoir, the compressed air header being shown in section and in elevation and the liquefying coils being shown in plan and in side elevation; Fig. 7 is a view similar to that shown in Fig. 6 showing a modification of the construction; and Fig. 8 is also a similar view showing still another modification of the construction.

Similar reference marks refer to similar parts throughout the several drawings.

At 1 I show an inlet or supply pipe for compressed air. The air, after having been compressed to about $6\frac{1}{2}$ atmospheres, or say 80 lbs. gage pressure and after having had the heat of compression removed by water cooling, is subjected to the chemical action, successively, of calcium chlorid to remove the moisture, and caustic potash to absorb the carbon dioxid gas therefrom. It is then received through the supply pipe 1 and its valve 1' of my improved rectifying apparatus, and delivered to what I call my auxiliary heat interchanger drum 2. This drum is filled with copper tubes 3, which connect the lower head 4 with the upper head 5, wherein it is cooled by an outflow of nitrogenous gas which passes around the tubes 3, across from side to side of the drum 2, guided by the baffle-plates 6, and which will be explained further on. This partially cooled compressed air then passes up through pipe 7 and branch pipe 8 to what I call my liquefied gas pre-cooler 9. This is practically a small low-temperature refrigerating system, which consists of the gas 3-stage compressor 10, whereby carbon dioxid gas or nitrous oxid gas, is compressed to 70 atmospheres, or a little over 1,000 pounds gage pressure. I prefer to use nitrous oxid.

At 11, I show the discharge pipe from the compressor (10), and at 12 I show the condenser, which is of the usual construction being supplied with running water at the inlet 13 and which is discharged at 14. The highly compressed gas is condensed to a liquid in the condenser 12, and is then forced up through pipe 15, and is released from pressure by the expansion valve 16. Thence the released liquefied gas passes into the double helical coil 17, inclosed in the pre-cooling drum 9, where it boils at near atmospheric pressure, as it drips down through the coil to the header 18; and thence the cold vapors therefrom pass up the pipe 19 to outside pipe 20, where they are returned to the compressor (10) and are re-compressed, being used over and over again.

The compressed air, after being partially cooled in the auxiliary interchanger 2, is delivered to the pre-cooling drum 9 through pipes 7 and 8 at the top. It thence passes down through the insulating fiber conduit 21, and from that at the bottom of the drum into the helical passage 22, and out at the top through pipe 24, to the primary heat interchanger drum 25. Here it is cooled by the very cold nitrogenous gases (at atmospheric pressure) from the rectifier column 26, delivered to the primary cooling drum 25, from the pipe 27. It will be noticed that the compressed gas as it passes through the two interchanger drums, 2 and 25, passes in a contrary direction to the cold expanded gas therein; and so also the compressed air as it passes down through the fiber conduit 21, and up through the helical passage 22, passes in a counter-current to the $N_2O$ or $CO_2$ liquid gas and vapor thereof in the double-helical coils 17 and upright pipe 19.

At 28 I show my rectifier evaporating reservoir, with its rectifying column 26. This reservoir is built preferably with a smaller diameter downwardly projecting part 30 at the bottom; and inclosed in the reservoir I have a high-pressure bottle 31, preferably made of copper, which is nearly as long or as high as the evaporating reservoir 28.

At 32 I show a series of small coiled tubes, which deliver at one end to the header 33, fixed to and connected with the bottle 31; these coiled tubes are preferably coiled as flat spirals in shape, the coils being "staggered", and are located in different substantially horizontal planes, the inlet ends being connected with the outside header 34. Instead of flat spiral coils helical coils may be used with their outlet ends delivering to the header 33 or separating bottle 31 at a lower point than where the other end is connected to the header 34, in which case the liquid in the coils drains by gravity from header 34 to header 33. The compressed air, after being finally cooled in the drum 25, almost to the point of liquefaction, is delivered to the header 34 through pipe 35, and from thence passes into the tube coils 32, which are submerged in the cold liquefied gases in reservoir 28.

The authorities do not agree as to the question of fractional or preferential condensation of the air. The drops of liquid which are formed in the liquefying coils may at first be composed of a liquid rich in oxygen or may be liquid air. These drops are directly in the path of the incoming stream of cold compressed air which is moving forward to occupy the space of the air previously liquefied. Such forwardly moving air impinges on the drops previously formed, envelops and physically contacts with them and impels them onward through the said liquefying coils toward the bottle 31. As a result of such simultaneous forward and onward movement of the liquefied and unliquefied portions of the air with the unliquefied portion enveloping and impinging upon the liquefied portion there is a continuous progressive washing, so to speak, of the liquefied portion. Consequently the unliquefied portion of the air is progressively impoverished in oxygen and the liquefied portion progressively enriched in oxygen, the said liquefied portion giving off portions of its nitrogen in exchange for such oxygen. As a result of the processes as immediately above set forth a continuous action and reaction between the liquefied and unliquefied portions of the air takes place so that the process of liquefaction and separation of the constituents of the air becomes very efficient.

At 36 I show a liquid air supply pipe, being supplied with liquid air from an outside source, which is delivered through and regulated by valve 37, to the sprinkler 38 inside of the rectifying column 26. Inside of the collecting and separating bottle (31) I have a siphon tube 39 having a release valve 40; and by opening this valve slightly, the liquefied gases in the bottle are forced up through the siphon tube 39 to the lower sprinkler 41, and released to practically atmospheric pressure. I fill the rectifying column 26 with hollow aluminum balls.

In order to insure that the liquid delivered to any of the sprinklers, shall drip down through all the balls, I have disks of perforated metal ($a, c, d, x, o, y, z$) at short distances from each other in the rectifying column, as shown in Figs. 2 and 3, or of wire gauze as shown in Figs. 4 and 5. In Fig. 2 the disk has perforations only in a center ring or circle, and in Fig. 3, the perforations are confined to an outer annular space or ring. The construction of these disks is more clearly shown in the Figs. 2, 3, 4 and 5 in the drawings than where located in use in the rectifying column. By alternating these disks, first one like Fig. 2 or Fig. 4 and followed by one like Fig. 3, or Fig. 5, a continuous stream of liquid dripping down in one perpendicular line, is prevented; for the liquid as it then drips down is forced to take a zig-zag course, and come in contact with all the balls, and also in contact with all the ascending gases evaporated from the liquefied gas at atmospheric pressure in the reservoir 28. At 43 I have an oxygen liquid evaporating tank, which is supplied with oxygen liquid or liquid rich in oxygen from the reservoir 28, through the pipe 44, from the bottom of the downwardly projecting part 30, being regulated by the valve 45; and from the top of the inner receptacle or bottle 31, I have a pipe 46 leading to and connected with a coil 47 in the liquid oxygen tank 43. This coil outlet is the pipe 48, which has a releasing valve 49, and the pipe (48) delivers to the sprinkler 50, in the top of the rectifying column (26). By opening slightly the release valve 49, the unliquefied nitrogenous gases or gases rich in nitrogen in the top of the bottle 31 pass into coil 47, which is submerged in the liquefied oxygen in the tank 43, and are all liquefied therein. Such liquefied gases are delivered to the top of the rectifying column through sprinkler 50, and drip down through the aluminum balls 42.

At 51 I have a pipe which carries the vapor from the oxygen liquid in tank 43, up into the cooling drum 52, and this oxygen gas after passing up through the drum (52), and cooling the incoming compressed air in the drum (52), may be collected at the outlet 53. The compressed air which is thus cooled is supplied through branch pipe 54 and valve 55; it passes out from the drum (52) by pipe 56 into the lower end of the header 34. The oxygen cooling drum 52 is built very similar to the other cooling drums, 2 and 25.

At 57 I have a draw-off cock whereby oxygen liquid may be drawn off if desired. In this case, when it is desired to draw off from the apparatus liquid oxygen, instead of gaseous oxygen, valves 49 and 55 should be closed; then by opening cocks 45 and 57 the liquid oxygen may be drawn off as it accumulates. By closing valves 49 and 55, the interchanger drum 52 and the oxygen vaporizing tank 43, including the liquefaction of the more refractory unliquefied nitrogenous gases or gases rich in nitrogen in the bottle 31, will be practically cut out of the system. In that case I have an outlet pipe 58 by which through valve 59, such nitrogenous unliquefied gases or gases rich in nitrogen as accumulate in the top of the high pressure bottle 31, may be released from pressure and delivered to the rectifier nitrogen gas discharge conduit 27, to mix with the nitrogen gases, the products of rectification, and utilized to such extent or in such amounts as may be found desirable, to help cool the compressed air which is being supplied to the system, as it passes in up through the low-pressure passages around the high-pressure tubes in the auxiliary interchanger 2 and down through the low-pressure passages in the primary interchanger 25.

Minor changes can be made in the construction of the apparatus without departing from the scope and purpose of my invention; for example, the coiled tubes (32) may be made helical in shape instead of spiral as shown in Fig. 8 of the drawing; or, the header 34 may be located inside of the evaporating vessel 28 also as shown in said Fig. 8; or said series of tubes (32) may deliver direct to the separating bottle 31 as shown in Fig. 7, thereby dispensing with the header 33. The important desideratum is that the coiled tubes shall be adapted to be submerged in the liquefied gases released to substantially atmospheric pressure, which were previously produced in the tubes under pressure; and that the tubes shall deliver to the separating bottle, and that the said bottle shall be so constructed and arranged that the liquefied gases will separate from the unliquefied therein.

Having thus described my invention what I claim as new and original, and desire to secure by Letters Patent, is—

1. In an apparatus for the separation of gaseous mixtures, the combination of a liquefied gas evaporating low-pressure receptacle; a header for the reception of gaseous mixtures; a high-pressure separating holder or bottle in said receptacle; horizontally arranged coiled tubes connected with the said header and with said holder or bottle and being adapted to be submerged wholly or partially in a liquid formed by the liquefaction of one of the constituents of the mixture, means for discharging the unliquefied gases from said bottle and other means for discharging the liquefied gases therefrom.

2. In an apparatus for the separation of the primary constituents of air, oxygen and nitrogen, the combination of a low-pressure vessel for the evaporation of pressure-released liquefied gases therein; a header for the reception of cooled compressed air; a bottle or high-pressure receptacle within said low-pressure vessel; said bottle being adapted to separate the liquefied from the unliquefied gases therein by gravity and a series of tubes connected with said header at one end and with said bottle or receptacle inclosed in said low-pressure vessel, at the other end—said tubes being adapted to be wholly or partially submerged in the pressure-released liquefied gases in said low-pressure vessel, means for discharging the unliquefied gases from said bottle and other means for discharging the liquefied gases therefrom.

3. In an apparatus for the separation of the primary constituents of air, oxygen and nitrogen, the combination of a low-pressure vessel for the reception and evaporation of pressure-released liquefied gases; a header for the reception of cooled compressed air; a metal bottle or high-pressure separating receptacle; said bottle being adapted to separate the liquefied from the unliquefied gases therein by gravity and a series of tubes connecting said header with said bottle or separating receptacle—said tubes being adapted to be submerged wholly or partially in a liquid formed by the liquefaction of one or both of the primary constituents of air, means for discharging the unliquefied gases from said bottle and other means for discharging the liquefied gases therefrom.

4. In an apparatus for the separation of gaseous mixtures, the combination of a liquefied gas evaporating low pressure chamber, a holder or bottle situated in said chamber, a series of coiled tubes connected with said holder or bottle, means for supplying a cold compressed gaseous mixture to said coiled tubes, the latter being adapted to be submerged wholly or partially in a liquid formed by the liquefaction of one of the constituents of the gaseous mixture, means for discharging the unliquefied gases from said holder or bottle and separate means for discharging the liquefied gases therefrom.

5. In an apparatus for the separation of the primary constituents of air, oxygen and nitrogen, the combination of a rectifying column or drum; metal balls therein; and a plurality of metal disks across the inside of said column at different points, some of said disks having openings or apertures near the periphery, and some with openings or apertures in and near the center—the two kinds of said disks being alternated in location in said column.

6. In an apparatus for the separation of the primary constituents of air, oxygen and nitrogen, the combination of a rectifying column or drum; aluminum balls therein; and a plurality of metal disks across the inside of said column at different points, some of said disks having openings or apertures near the periphery, and some with openings or apertures in and near the center—the two kinds of said disks being alternated in location in said column.

7. In an apparatus for the separation of the primary constituents of air, oxygen and nitrogen, the combination of a rectifying column or drum; hollow aluminum balls therein; and a plurality of metal disks across the inside of said column at different points, some of said disks having openings or apertures near the periphery, and some with openings or apertures in and near the center—the two kinds of said disks being alternated in location in said column.

8. In an apparatus of the character described, the combination of rectifying means for the separation of air into its constituents, oxygen and nitrogen, means for receiving and holding liquefied oxygen after rectification, means for conveying nitrogen gas from the said rectifying means, means for bringing compressed air into thermal but not physical contact with the said nitrogen gas to cool the same, means for thereafter further cooling the said compressed air, means for again bringing the compressed air into thermal but not physical contact with the nitrogen at a point in the apparatus preceding the point at which the air and nitrogen are first brought into thermal relation to each other, and means for thereafter conducting the air while under compression in thermal but not physical contact with the said liquefied oxygen to liquefy the same.

9. In an apparatus of the character described, the combination of rectifying means for the separation of air into its constituents, oxygen and nitrogen, means for receiving and holding liquefied oxygen after rectification, means for conveying nitrogen gas from the said rectifying means, means for bringing compressed air into thermal but not physical contact with the said nitrogen gas to cool the same, means for thereafter further cooling the said compressed air, means for again bringing the compressed air into thermal but not physical contact with the nitrogen at a point in the apparatus preceding the point at which the air and nitrogen are first brought into thermal relation to each other, means for thereafter conducting the air while under compression in thermal but not physical contact with the said liquefied oxygen to liquefy the same, and means for thereafter partially separating the oxygen and nitrogen and separately discharging the same in such partially separated state into the said rectifying means.

10. In an apparatus of the character described, the combination of a rectifying column, means having connection with said column for receiving and holding liquefied oxygen, a passage-way for conveying nitrogenous gases from the said rectifying column, a thermal interchanger through which compressed air travels in one direction and the said nitrogenous gases in the opposite direction whereby the said air is cooled, means for conveying said air thus cooled in thermal but not physical contact with a liquefied gas released from pressure, a thermal interchanger wherein the said air is again caused to travel in thermal but not physical contact with the said nitrogenous gases at a point in the apparatus preceding the first mentioned thermal interchanger, and means for conveying the air in thermal but not physical contact with the liquefied oxygen aforesaid to liquefy the same.

11. In an apparatus of the character described, the combination of a rectifying column, means having connection with said column for receiving and holding liquefied oxygen, a passage-way for conveying nitrogenous gases from the said rectifying column, a thermal interchanger through which compressed air travels in one direction and the said nitrogenous gases in the opposite direction whereby the said air is cooled, means for conveying said air thus cooled in thermal but not physical contact with a liquefied gas released from pressure, a thermal interchanger wherein the said air is again caused to travel in thermal but not physical contact with the said nitrogenous gases at a point in the apparatus preceding the first mentioned thermal interchanger, means for conveying the air in thermal but not physical contact with the liquefied oxygen aforesaid to liquefy the same, means for partially separating the oxygen and nitrogen, means for thereafter liquefying the gas rich in nitrogen, and means for separately discharging the liquefied gas rich in oxygen and liquefied gas rich in nitrogen into the said rectifying column.

12. In an apparatus of the character described, the combination of a rectifying column, means for receiving liquefied oxygen from said column and holding the same, a passage-way for conveying nitrogen gas from said rectifying column, said passage-way including a plurality of thermal interchangers, means for delivering air under compression to one of said interchangers wherein it is cooled, a thermal interchanger cooled by the expansion of a liquefied gas released from pressure, means for conveying the air to the other one of the first mentioned interchangers which other interchanger precedes the interchanger to which the air is first delivered, and means for conveying the air thus thrice cooled into thermal but not physical contact with the liquefied oxygen delivered from the said rectifying column whereby the said air is partially or wholly liquefied.

13. In an apparatus of the character described, the combination of a rectifying column, means for receiving liquefied oxygen from said column and holding the same, a passage-way for conveying nitrogen gas from said rectifying column, said passage-way including a plurality of thermal interchangers, means for delivering air under compression to one of said interchangers wherein it is cooled, a thermal interchanger cooled by the expansion of a liquefied gas released from pressure, means for conveying the air to the other one of the first mentioned interchangers which other interchanger precedes the interchanger to which the air is first delivered, means for conveying the air thus thrice cooled into thermal but not physical contact with the liquefied oxygen delivered from the said rectifying column whereby the said air is partially or wholly liquefied, means for separating liquefied from the unliquefied portions of air, means for thereafter liquefying the unliquefied portion and separate means for discharging the first and second mentioned liquefied portions into the said rectifying column.

14. In an air-liquefying rectifier for the separation of the primary constituents of air, oxygen and nitrogen, a rectifying column or drum having a liquefied gas low-pressure vaporizing vessel at the lower end thereof, in operative combination with a high-pressure separating bottle or receptacle; a compressed air header, having a series of tubes fed with compressed air from said header and delivering to said separating bottle—said tubes being adapted to be submerged, wholly or partially, in liquefied gas in said vaporizing vessel, previously liquefied in said series of tubes under compression, and released from pressure after liquefaction, means for discharging the unliquefied gases from said bottle and other means for discharging the liquefied gases therefrom.

15. In an apparatus for the separation of gases, the combination of a header, means for supplying cold compressed mixed gases to said header, a receptacle, a separating bottle situated in said receptacle, pipes extending from said header to the said bottle said pipes being arranged in substantially flat horizontal coils, the portions of the said coils within the said receptacle and the said bottle being adapted to be submerged in a liquefied constituent of the said gaseous mixture, means for conveying the unliquefied portions of said gases from said bottle, other means for conveying the liquefied portions of said gases from said bottle, and means for completing the separation of the gaseous constituents of said mixture.

16. In an apparatus for separating the oxygen and nitrogen of the air, the combination of the rectifying column having an oxygen receiving chamber at its lower end, a header, means for supplying cold compressed air to said header, a separating bottle in the said oxygen receiving chamber, a plurality of pipes each having connection at one end with the said header and at its other end with the said bottle and each of said pipes being arranged in substantially flat horizontal coils, a tank, means for supplying oxygen to said tank from the said oxygen receiving chamber, a pipe leading from the upper portion of said bottle and extending to and through the said tank and discharging into the upper end of the said rectifying column, substantially as described.

17. In an apparatus for the separation of the oxygen and nitrogen of the air, the combination of a rectifying column having at its lower end an oxygen receiving chamber, a header situated outside of the said chamber, a separating bottle situated within the said chamber, a plurality of coils each having connection at one end with said header and at its other end with the said bottle said coils being arranged in substantially flat horizontal coils, a tank, means for conveying oxygen from the said oxygen chamber to the said tank, a pipe for conveying the unliquefied portions of the gases of the air from the upper end of said bottle to and through the said tank, such unliquefied portions being liquefied in said tank and such liquefied portions being discharged into the upper end of the said rectifying column, means for discharging the liquefied portions of the said gases from the said bottle into a lower portion of the said rectifying column, a counter-current heat interchanging drum and pipes leading from the upper ends of the said rectifying column and the said separating bottle into the said drum for cooling the air to be thereafter liquefied and separated into its constituent parts, oxygen and nitrogen.

Signed at New York city in the county of New York and State of New York this fifth day of June, A. D. 1915.

JAMES F. PLACE.

Witnesses:
J. G. GADSDEN,
CLARENCE PLACE.